Jan. 27, 1970

A. R. BRAUN 3,491,787

SELF-RESTARTING SIPHON

Filed Oct. 19, 1967

Arthur R. Braun
INVENTOR.

BY Dominik, Stein + Knuchtel
ATTORNEYS

United States Patent Office 3,491,787
Patented Jan. 27, 1970

3,491,787
SELF-RESTARTING SIPHON
Arthur R. Braun, Cary, Ill., assignor, by mesne assignments, to Warner-Lambert Pharmaceutical Company, Morris Plains, N.J., a corporation of Delaware
Filed Oct. 19, 1967, Ser. No. 676,436
Int. Cl. F04f 10/02
U.S. Cl. 137—142                          8 Claims

ABSTRACT OF THE DISCLOSURE

A self-restarting siphon, especially useful for fish aquariums, having an inlet arm, an overflow bight and a spillway arm, both arms having 180° turns, the turn of the spillway arm below the turn of the inlet arm.

---

This invention relates to a siphon and more particularly to a siphon which automatically restarts its siphoning action as the upper surface of liquid to be siphoned off reaches a certain high level.

A siphon operates by reason of atmospheric pressure co-acting with a column of liquid in a U-shaped tube of limited diameter. With the bight portion of the U-tube extending above the higher level of two bodies of liquid, and with one arm (the spillway) of the U-tube extending below that level, and with the U-tube filled with liquid, atmospheric pressure on the uppermost level of liquid will cause continued flow of liquid up over the bight portion and through the spillway into the lowermost level of liquid until the levels are equal. It is crucial that the U-tube remain substantially filled with liquid, otherwise both arms of the tube will act as spillways until the tube is emptied.

In order to restart a siphon, it is necessary to refill the U-tube. This is undesirable because it is time consuming, messy and occasionally difficult.

For example, in an aquarium, it is customary to siphon the water from the main fish tank to an auxiliary filter tank where the water is filtered and then pumped back to the main fish tank in aerated form. There is usually no means provided to maintain the level of water in the main fish tank constant. So, as time proceeds and as the level drops by reason of evaporation and other factors, the siphoning action is broken. To restore it, water must be added to the tank and the siphon filled via extensive manipulation of the U-tube.

There are siphons which act automatically to replenish the liquid column. But, these are generally designed for permanent installation, such as in water closets, with extensive means for causing restart of the siphoning action. Typical teachings of such are:
U.S. Nos. 210,965, 252,344, 343,853, 853,705, 876,641, 1,077,218, 1,755,218, 1,942,094.

It will be evident from the above patents that a simple, automatic restart siphon for non-permanent installation has yet to be devised.

An object of this invention is to provide a siphon.

Another object is to provide a siphon which is especially useful for aquarium use.

Still another object is to provide a siphon of unitary tube construction, making it simple to manufacture.

A further object is to provide a siphon having a unique inlet means.

Other objects of the invention will in part be obvious and will in part appear hereinafter.

A siphon structure has now been found which accomplishes the above objectives. It comprises, in its most broadest aspect, a U-tube with an open tubular inlet arm and an open tubular spillway arm with an overflow bight connecting the two arms at their high point. The inlet and spillway arms have a 180° turn. The inlet arm has a restart opening therein above said turn. The restart opening is in communication with the opening of the inlet arm and the later is above the opening of said spillway arm.

The invention accordingly comprises the several steps and the relation of one or more of such steps with respect to each of the others thereof, and the features of construction, combination of elements, and arrangement of parts which will be exemplified in the method and apparatus hereinafter disclosed, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

Figure 1:
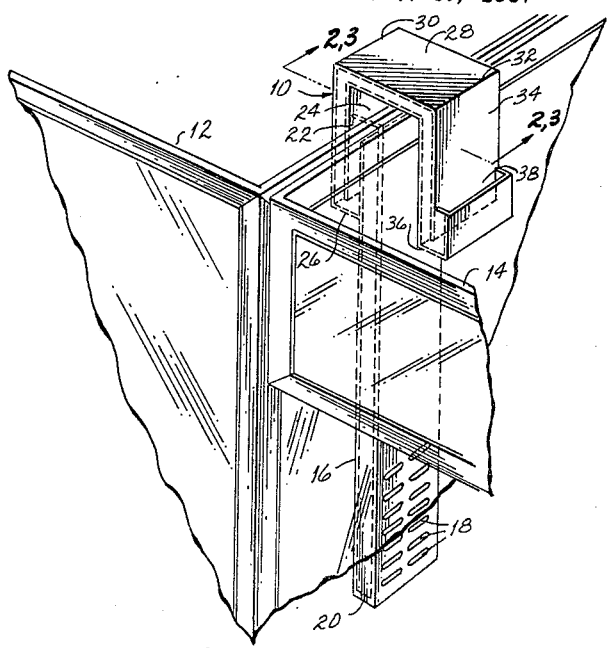
FIG. 1 is a perspective view of the siphon of this invention straddling an aquarium tank and a filter tank.

Referring now to FIG. 1, there is shown the overall siphon device 10 having a general exterior shape of an inverted letter J, the longer portion of which extends downwardly into an aquarium tank 12, while the shorter end projects downwardly into a filter tank 14. For purposes of ascertaining proper operation of the siphon, it is preferred, although not necessary, that the siphon be constructed of a transparent or translucent material such as glass or plastic.

Figure 2:
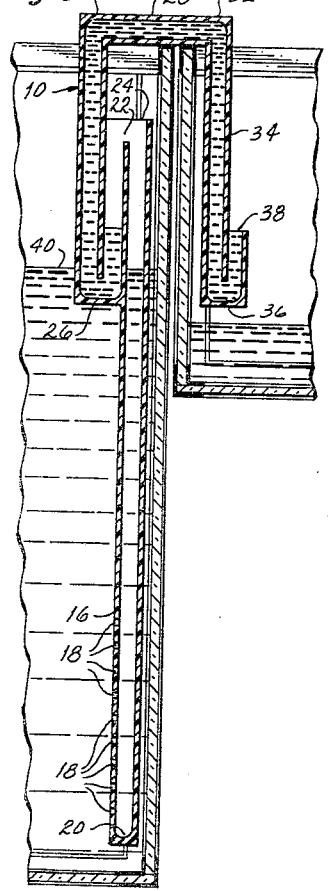
FIG. 2 is a cross-sectional view of the siphon taken along line 2—2 of FIG. 1.
Figure 3:
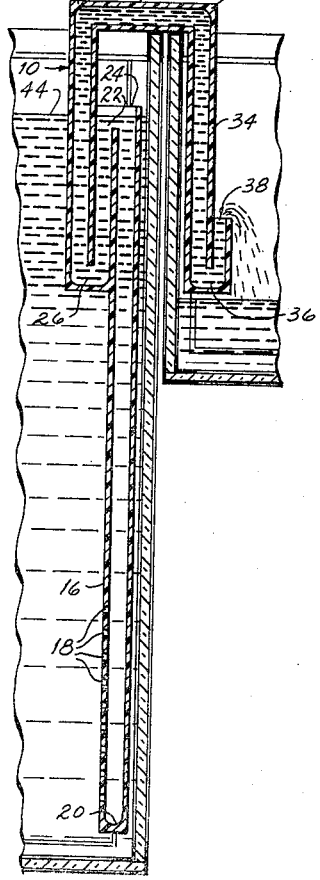
FIG. 3 is a cross-sectional view of the siphon taken along line 3—3 of FIG. 1.

As seen best in FIGS. 2 and 3, the longer portion of the siphon (the open tubular inlet arm 16) has numerous small slotted inlet apertures 18 for admitting influent liquid while precluding larger debris, fish, or other paraphernalia commonly used inside aquariums. For this reason, it is preferable that the terminus 20 of the inlet arm be closed, although it could obviously perform its function of siphoning if it were open. In actuality, the inlet opening to inlet arm 16 must be higher than the outlet opening of outlet or spillway arm 34 to effect the siphon action. This structure appears in the siphon of this invention (inlet 24 above outlet 38) as will become evident as the description proceeds.

Observing now the path of the siphon flow vertically from the inlet apertures 18, it can be seen that the siphon, in cross-section, takes on the configuration of a sort of labyrinth. It has a first 180° restart turn 22 with a mid-inlet opening 24 and a second 180° bight feed turn 26, below turn 22. Mid-inlet opening 24 vents inlet arm 16 and also enables easier access to overflow liquid to siphon action.

The siphon of this invention then has the usual overflow bight 28; in this instance, two right angular bends, 30 and 32. Other configurations, such as two curves or a hemispheric bend, may also be utilized.

The spillway arm 34 of the siphon 10 has a third 180° head lock turn 36 with an outlet 38. It will be noted that outlet 38 is below turn 22 of the inlet arm 16. Such positioning of turn 22 with respect to outlet 32 is critical to automatic restart operation of the siphon.

This is best seen by reference to FIGS. 2 and 3. As seen in FIG. 2, a low level 40 of liquid in aquarium 12 will not cause a siphon action because outlet 38 is above the level 40. However, the bight portion 28 of the siphon maintains its column of liquid because atmospheric pressure acts equally upon both the liquid in turn 26 and in turn 36.

As the level 40 in aquarium tank 12 rises so does the level in inlet arm 16, because of its open-apertures 18 and the tendency of a body of liquid in free communication with all its branches to reach its own level. But no siphon action starts at this time.

The water continues to rise in aquarium 12 as water is added until it reaches turn 22. Now a hydraulic head above the level of outlet 38 is created initiating a flow of liquid up and over the bight portion 28 of the siphon 10. During such, atmospheric pressure has its usual function. It presses against level 44 of aquarium tank 12 to resist any voids in overflow bight 28 and to keep water flowing through inlet arm 16, up over turn 22 and down to turn 26, then up over overflow bight 28, around turn 36 and out outlet 38 into the filter tank 14. The pump usually used in association with such filter tanks pumps the water back into aquarium tank 12 after it is cleaned and filtered, thereby maintaining a continuous circulating flow of water.

It should be evident from the above that restart turn 22 above outlet 38 is necessary to restart siphon flow. And, since water is rarely added to the aquarium with such rapidity to cause inflow at this point, even if it did, the restart head would be created and the siphon would function efficiently in the automatic restart manner intended until level 44 sank below turn 22.

Figure 4:
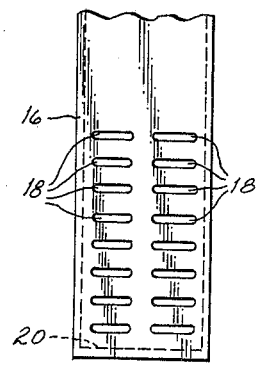
FIG. 4 is a side view of the lower end of the siphon.

FIG. 4 discloses in detail the inlet apertures of the preferred form of the siphon. These smoothen and space the draw-off level of water from the aquarium; that is, water is drawn off for filtering and clean-up at several levels, thereby effecting cleaner water at all levels of the aquarium.

As indicated above, the siphon is preferably constructed of transparent or translucent material, such as glass or plastic. It may be fabricated from a single piece of tubing bent and slit at a midpoint to provide a restart inlet, or else it may be fabricated of flat plastic sheet, cut and glued at appropriate edges to form the hollow body, or injection molded in whole or in part and then assembled, or cut from two pieces of solid plastic stock and assembled.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

Now that the invention has been described:
What is claimed is:

1. A self-restarting siphon comprising an open tubular inlet arm, an open tubular spillway arm and an overflow bight between said arms, a 180° restart turn in said inlet arm and a 180° head-lock turn in said spillway arm, said inlet arm having an air-vent opening above said restart turn, and said restart turn being located horizontally above said head-lock turn and the opening of said spillway arm to effect siphon action once restarted.

2. The siphon of claim 1 further including a bight feed turn below said restart turn and between said restart turn and said overflow bight.

3. The siphon of claim 1 wherein said inlet arm extends downwardly below said outlet arm but has a plurality of inlet apertures therein to effect even flow from several levels of the liquid being siphoned.

4. The siphon of claim 1 constructed of bent tubing opened at its mid-portion to effect and restart opening.

5. The siphon of claim 1 constructed as an integral injection molded article.

6. The siphon of claim 1 constructed of sheet plastic.

7. A circulating flow aquarium comprising an aquarium tank and a filter tank and the self-restarting siphon of claim 1 in communication with both said tanks, the inlet opening and said restart turn of said inlet arm located in said aquarium tank and the opening and said head lock turn of said spillway arm located in said filter tank, and liquid pump means from said filter tank to said aquarium tank.

8. The aquarium of claim 7 wherein said inlet arm extends downwardly below said outlet arm but has a plurality of inlet apertures therein to effect even flow from several levels of the liquid being siphoned.

References Cited

UNITED STATES PATENTS

| 886,390 | 5/1908 | Moninghoff | 137—140 X |
| 2,791,232 | 5/1957 | Downs | 137—153 |

FOREIGN PATENTS

| 434,699 | 12/1911 | France. |
| 1,124,362 | 2/1962 | Germany. |

M. CARY NELSON, Primary Examiner

MICHAEL O. STURM, Assistant Examiner

UNITED STATES PATENT AND TRADEMARK OFFICE
CERTIFICATE OF CORRECTION

PATENT NO. : 3,491,787
DATED : January 27, 1970
INVENTOR(S) : Arthur R. Braun

It is certified that error appears in the above-identified patent and that said Letters Patent are hereby corrected as shown below:

In the heading at the top of Column 1, delete "assignor, by mesne assignments, to Warner-Lambert Pharmaceutical Company, Morris Plaines, N.J., a corporation of Delaware".

Signed and Sealed this

Seventh Day of February 1978

[SEAL]

Attest:

RUTH C. MASON
Attesting Officer

LUTRELLE F. PARKER
Acting Commissioner of Patents and Trademarks